(12) United States Patent
Arnault et al.

(10) Patent No.: US 11,371,598 B2
(45) Date of Patent: Jun. 28, 2022

(54) PULLEY DEVICE FOR A TENSIONER ROLLER OR WINDING ROLLER

(71) Applicant: Aktiebolaget SKF, Gothenburg (SE)

(72) Inventors: Benoit Arnault, Saint-Cyr-sur-Loire (FR); Benoît Hauvespre, Saint Etienne de Chigny (FR); Nicolas Tronquoy, Fondettes (FR)

(73) Assignee: SKF Aerospace France S.A.S

( * ) Notice: Subject to any disclaimer, the term of this patent is extended or adjusted under 35 U.S.C. 154(b) by 267 days.

(21) Appl. No.: 16/363,401

(22) Filed: Mar. 25, 2019

(65) Prior Publication Data

US 2019/0301588 A1   Oct. 3, 2019

(30) Foreign Application Priority Data

Apr. 3, 2018 (FR) .................................. 1852854

(51) Int. Cl.
| | |
|---|---|
| *F16H 57/00* | (2012.01) |
| *F16C 19/06* | (2006.01) |
| *F16H 7/12* | (2006.01) |
| *F16H 55/36* | (2006.01) |
| *F16H 7/20* | (2006.01) |
| *F16C 19/18* | (2006.01) |
| *F16H 7/08* | (2006.01) |

(52) U.S. Cl.
CPC ......... *F16H 57/0031* (2013.01); *F16C 19/06* (2013.01); *F16C 19/18* (2013.01); *F16H 7/08* (2013.01); *F16H 7/12* (2013.01); *F16H 7/20* (2013.01); *F16H 55/36* (2013.01); *F16C 2361/63* (2013.01); *F16H 2007/0865* (2013.01)

(58) Field of Classification Search
CPC ................ F16C 13/006; F16C 2361/63; F16H 2007/0865; F16H 55/36; F16H 7/20
USPC ......................................................... 474/199
See application file for complete search history.

(56) References Cited

U.S. PATENT DOCUMENTS

| | | | | |
|---|---|---|---|---|
| 3,722,968 | A * | 3/1973 | Bomberger | ........... F16C 13/006 384/492 |
| 4,025,132 | A * | 5/1977 | Watanabe | ............ F16C 13/006 384/130 |
| 4,113,328 | A * | 9/1978 | Vander Meulen | ..... B65G 39/09 384/482 |
| 4,474,562 | A * | 10/1984 | Heurich | ............... F16H 7/1281 29/517 |

(Continued)

FOREIGN PATENT DOCUMENTS

| | | |
|---|---|---|
| DE | 102011077019 A1 | 12/2012 |
| EP | 3135957 A1 | 3/2017 |

(Continued)

*Primary Examiner* — Henry Y Liu
(74) *Attorney, Agent, or Firm* — Garcia-Zamor Intellectual Property Law; Ruy Garcia-Zamor; Bryan Peckjian

(57) ABSTRACT

A pulley device for a tensioner roller or winding roller of a transmission element, having a pulley, a bearing, and an annular protective flange. The flange provides a first radial portion of small diameter, the first radial portion bearing against a fixed inner ring of the bearing, a second radial portion of large diameter, and a substantially axial intermediate portion connecting the first and second radial portions. The intermediate portion forms a circumferential trough, the bottom of which is offset radially towards the inside of the pulley device compared with the outer edge of the fixed inner ring.

18 Claims, 4 Drawing Sheets

(56) References Cited

U.S. PATENT DOCUMENTS

| | | | | |
|---|---|---|---|---|
| 4,504,252 A * | 3/1985 | Honma | F16C 13/006 | 474/112 |
| 4,511,192 A * | 4/1985 | Hans | F16C 13/006 | 384/543 |
| 4,602,875 A * | 7/1986 | Doerr | F16H 55/48 | 384/547 |
| 4,610,646 A * | 9/1986 | Walter | F16C 13/006 | 474/174 |
| 4,792,243 A * | 12/1988 | Takeuchi | F16C 33/6618 | 384/486 |
| 4,810,108 A * | 3/1989 | Yajima | F16C 13/006 | 384/488 |
| 4,863,293 A * | 9/1989 | Sytsma | F16C 13/006 | 384/482 |
| 5,630,769 A * | 5/1997 | Schmidt | B60B 5/02 | 474/167 |
| 5,725,448 A * | 3/1998 | Kato | F16C 13/006 | 384/510 |
| 5,775,819 A * | 7/1998 | Kinney | F16C 13/006 | 384/449 |
| 6,220,982 B1 * | 4/2001 | Kawashima | F16H 55/44 | 474/199 |
| 6,241,257 B1 * | 6/2001 | Hauck | F16C 13/006 | 277/637 |
| 6,357,926 B1 * | 3/2002 | Hauck | F16C 13/006 | 384/546 |
| 6,854,893 B2 * | 2/2005 | Schmidt | F16C 13/006 | 384/477 |
| 7,011,593 B2 * | 3/2006 | Schenk | F16C 33/723 | 474/199 |
| 7,591,593 B2 * | 9/2009 | Tsujimoto | F16C 33/7896 | 384/486 |
| 7,695,385 B2 * | 4/2010 | Barraud | F16C 35/07 | 474/199 |
| 8,012,053 B2 * | 9/2011 | Filip | F16C 13/006 | 474/144 |
| 8,172,056 B2 * | 5/2012 | Barraud | F16D 41/069 | 192/45.1 |
| 8,235,851 B2 * | 8/2012 | Eidloth | F16C 33/6607 | 474/199 |
| 9,086,139 B2 * | 7/2015 | Varnoux | F16C 35/063 | |
| 9,416,863 B2 * | 8/2016 | Schaefer | F16H 55/48 | |
| 9,452,580 B2 * | 9/2016 | Swane | F16H 55/48 | |
| 9,464,700 B2 * | 10/2016 | Hedman | F16C 33/586 | |
| 9,506,538 B2 * | 11/2016 | Hedman | F16H 7/20 | |
| 2004/0097313 A1 * | 5/2004 | Singer | F16C 41/04 | 474/199 |
| 2004/0235599 A1 * | 11/2004 | Ozorak | F16C 25/08 | 474/199 |
| 2005/0026729 A1 * | 2/2005 | Schenk | F16C 33/7896 | 474/101 |
| 2006/0153484 A1 * | 7/2006 | Ohata | F16C 33/7823 | 384/484 |
| 2006/0171622 A1 * | 8/2006 | Ohata | F04B 27/1063 | 384/513 |
| 2007/0072714 A1 * | 3/2007 | Filip | F16C 33/723 | 474/144 |
| 2007/0242909 A1 * | 10/2007 | Fournier | F16C 29/045 | 384/132 |
| 2008/0132365 A1 * | 6/2008 | Boussaguet | F16H 7/20 | 474/136 |
| 2008/0230341 A1 * | 9/2008 | Barraud | F16D 41/069 | 192/41 A |
| 2009/0098967 A1 * | 4/2009 | Eidloth | F16C 19/26 | 474/199 |
| 2009/0226124 A1 * | 9/2009 | Nakagawa | F16C 33/7859 | 384/478 |
| 2009/0298630 A1 * | 12/2009 | Mineno | F16C 35/063 | 474/199 |
| 2011/0009220 A1 * | 1/2011 | Arnault | F16C 35/073 | 474/166 |
| 2012/0028745 A1 * | 2/2012 | Mola | F16C 13/006 | 474/166 |
| 2012/0142468 A1 * | 6/2012 | Lescorail | F16C 43/04 | 474/136 |
| 2012/0142470 A1 * | 6/2012 | Varnnoux | F16C 19/163 | 474/199 |
| 2013/0225344 A1 * | 8/2013 | Arnault | F16H 55/36 | 474/166 |
| 2013/0337952 A1 * | 12/2013 | Berruet | F16F 15/1245 | 474/94 |
| 2013/0337953 A1 * | 12/2013 | Berruet | F16D 3/68 | 474/94 |
| 2014/0364258 A1 * | 12/2014 | Lescorail | F01P 5/12 | 474/150 |
| 2015/0141185 A1 * | 5/2015 | Albrecht | F16H 55/36 | 474/199 |
| 2015/0267791 A1 * | 9/2015 | Hedman | F16C 13/006 | 474/199 |
| 2015/0292603 A1 * | 10/2015 | Cherioux | F16H 7/20 | 474/166 |
| 2015/0300463 A1 * | 10/2015 | Albrecht | F16H 7/20 | 474/166 |
| 2016/0327146 A1 * | 11/2016 | Lescorail | F16H 55/36 | |

FOREIGN PATENT DOCUMENTS

| | | |
|---|---|---|
| FR | 3025276 A1 | 3/2016 |
| FR | 3078759 A1 | 9/2019 |
| JP | 2006162035 A | 6/2006 |
| JP | 2010270882 A | 12/2010 |
| WO | 2007036407 A1 | 4/2007 |

* cited by examiner

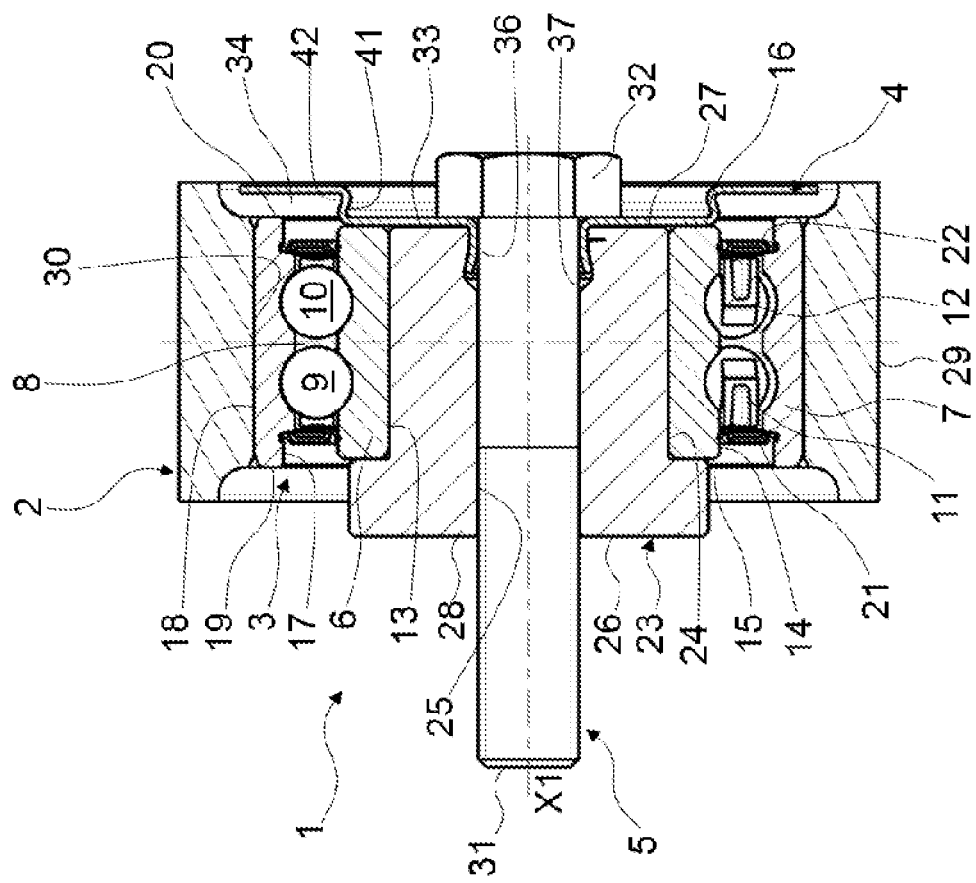

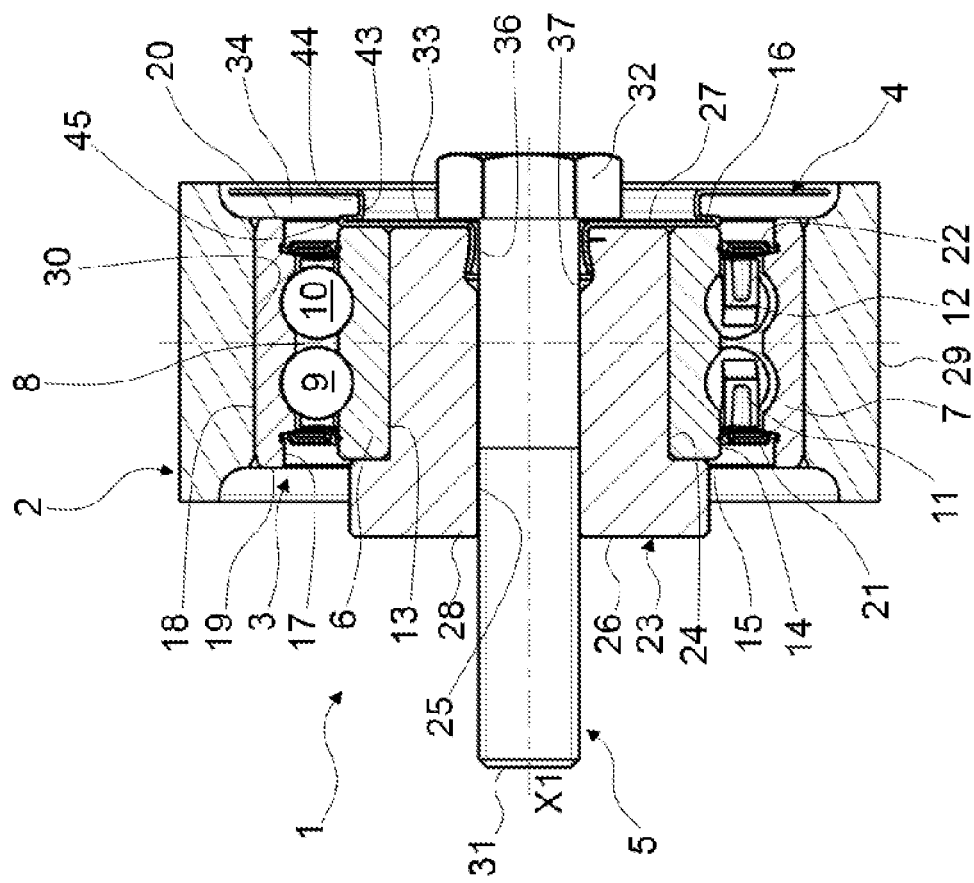

PULLEY DEVICE FOR A TENSIONER ROLLER OR WINDING ROLLER

CROSS-REFERENCE

This application claims priority to French patent application no. 1852854 filed on Apr. 3, 2018, the contents of which are fully incorporated herein by reference.

TECHNOLOGICAL FIELD

The present invention relates to the field of pulley devices for tensioner rollers or winding rollers that are intended to cooperate with a transmission element, for example a timing belt or chain or a drive belt or chain of a motor vehicle internal combustion engine.

BACKGROUND

Such rollers serve generally to permanently maintain tension in the transmission element in a given range or to locally modify the path taken thereby. The rollers are thus referred to as tensioner rollers and winding rollers, respectively. In winding rollers, the pulley is rotatably mounted on a threaded screw body via a bearing, the roller then being fixed directly or indirectly to the engine block or to an element of a tensioner roller device, for example an articulated arm or an eccentric.

The bearing generally comprises a fixed inner ring having a bore through which the screw passes, a rotating outer ring surmounted by the pulley, and at least one row of rolling elements interposed between the rings.

Such devices are often equipped with additional protective flanges that help to protect the device from contaminants or spatter originating from the outside environment. The flange also serves as a thrust washer for the head of the screw.

However, particles or other polluting elements can get between the flange and the bearing of the pulley device. The bearing is generally provided with additional sealing means inherent thereto, for example seals which close the bearing chamber in which the rolling elements are housed, and which are able to stop this pollution.

However, this pollution can build up over time in the immediate vicinity of the sealing means of the bearing. Since the sealing means can become worn, the risk of the pollution getting into the bearing chamber increases with the duration of use of the pulley device. This internal pollution can have the consequence of accelerated deterioration of the internal components of the bearing, in particular the contact surfaces between the rolling elements and the rings. This can result in a drop in the quality of the rotating mechanical connection provided by the pulley device, and a reduced service life of the internal components thereof. The risk of breakage, notably in operating mode, is also higher.

SUMMARY

The present invention aims to remedy this drawback.

More particularly, the present invention aims to provide a pulley device that is resistant to high levels of pollution, is particularly economical, is easy and safe to mount, forming a subassembly that is incapable of being dismantled, and has a smaller axial and radial space requirement.

The invention relates to a pulley device for a tensioner roller or winding roller for a transmission element, comprising a pulley, a bearing, and a protective flange.

The bearing is provided with a rotating outer ring surmounted by the pulley, a fixed inner ring, the rings being coaxial and forming a radial space between one another, sealing means closing the radial space on each axial side, and at least one row of rolling elements, arranged in the radial space, and the bearing has a mounting bore intended to take a screw.

The protective flange is annular and comprises a first radial portion of small diameter provided with an inner edge forming a bore of the flange and an outer edge, the first radial portion bearing against a front surface of the fixed inner ring, a second radial portion of large diameter provided with an inner edge and an outer edge, and a substantially axial intermediate portion connecting the outer edge of the first radial portion and the inner edge of the second radial portion.

According to the invention, the intermediate portion forms a circumferential trough, the bottom of which is offset radially towards the inside of the pulley device compared with the outer edge of the front surface of the fixed inner ring.

According to further advantageous but non-essential features of the invention, taken on their own or in combination:

The inner ring of the bearing comprises a bore forming the mounting bore of the bearing that is intended to take a screw.

The bearing comprises an annular spacer mounted in a bore of the inner ring of the bearing, the spacer being provided with a bore forming the mounting bore of the bearing that is intended to take a screw.

The rolling elements are balls.

A cage maintains the circumferential spacing of the rolling elements.

The intermediate portion of the flange is cylindrical.

The intermediate portion of the flange is frustoconical.

The frustoconical intermediate portion is directed towards the inside of the pulley device.

The frustoconical intermediate portion is directed towards the outside of the pulley device.

The circumferential trough has the second radial portion of large diameter of the flange as its outer lateral edge.

The circumferential trough has the front surface of the fixed inner ring as its inner lateral edge.

The circumferential trough has the first radial portion of small diameter of the flange as its inner lateral edge.

The first radial portion of small diameter has a fold forming the inner lateral edge for the circumferential trough, the intermediate portion extending from the fold.

The outer edge of the second radial portion of large diameter extends in the immediate vicinity of the pulley so as to form a narrow passage.

The flange comprises an axial portion that extends axially from the bore of the first radial portion and is housed in the mounting bore of the bearing.

The axial portion is mounted securely in the mounting bore of the bearing.

The axial portion is mounted tightly in the mounting bore of the bearing.

The axial portion comprises retaining means that cooperate with the central mounting bore of the bearing.

The flange comprises retaining means that are intended to cooperate with the screw.

The pulley is made of metal, for example of steel.

The pulley is made of plastics material, for example of polyamide.

The pulley is formed by overmoulding plastics material on the outer ring of the bearing.

The flange is made of metal, for example of steel.

The flange is made of plastics material, for example of polyamide.

BRIEF DESCRIPTION OF THE DRAWINGS

The present invention will be understood better from reading the detailed description of a number of embodiments, which are given by way of entirely non-limiting example and are illustrated in the appended drawings, in which:

FIG. 3 is a view in axial section of a pulley device according to a third embodiment; and FIG. 4 is a view in axial section of a pulley device according to a fourth embodiment.

DETAILED DESCRIPTION

Figure 1:
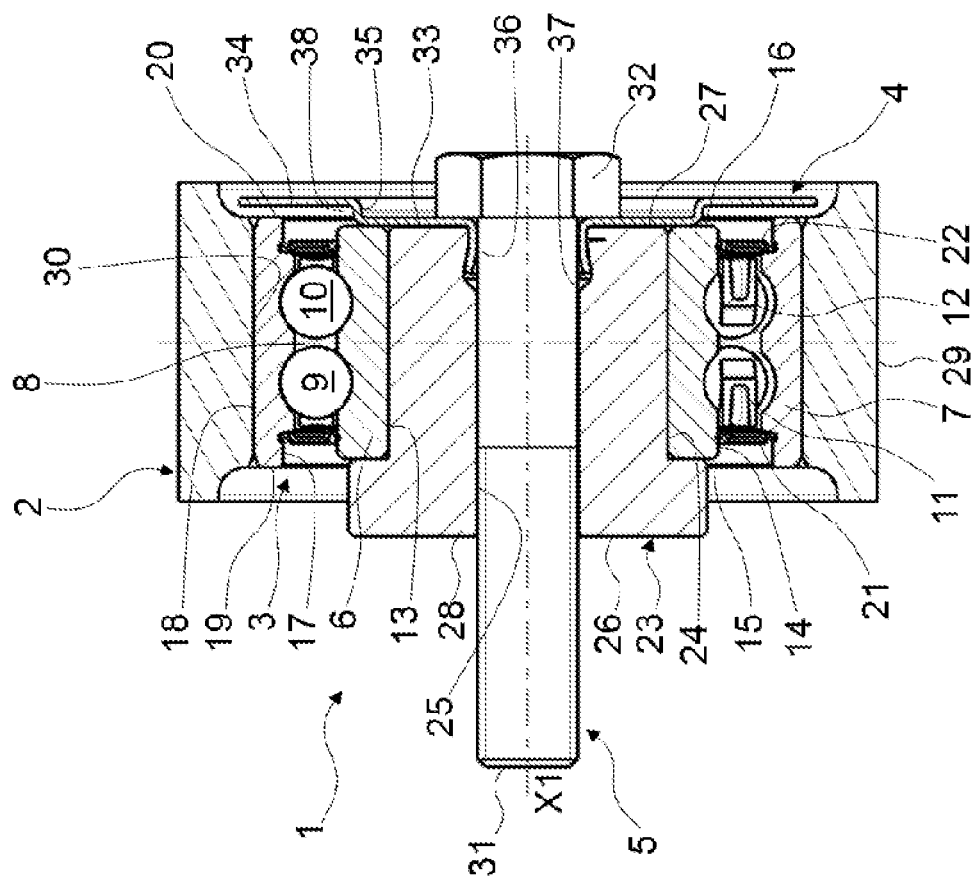
FIG. 1 is a view in axial section of a pulley device according to a first embodiment.

As can be seen in FIG. 1, a pulley device for a tensioner roller or winding roller of a belt, bearing the overall reference 1, has a geometric axis X1 and comprises a pulley 2 designed to cooperate with a transmission element (not shown) such as a belt or a chain, a bearing 3, a protective flange 4, and a screw 5.

The bearing 3 comprises a fixed inner ring 6, a rotating outer ring 7, the rings 6, 7 being coaxial about the axis X1 and forming a radial space 8 between one another. The bearing 3 also comprises two rows of rolling elements 9 and 10, in the form of balls here, that are disposed between the rings, and cages 11 and 12 that maintain the circumferential spacing of the rolling elements 9 and 10, respectively.

The inner ring 6 and outer ring 7 are concentric. In the exemplary embodiment illustrated, the rings are solid, that is to say obtained by machining or grinding with removal of material from metal tubes, bars, forged parts or rolled blanks.

The inner ring 6 comprises a bore 13, an outer cylindrical surface 14 provided with raceways that have, in axial section, a concave internal profile suitable for the rolling elements 9, 10, and two front surfaces 15, 16.

The outer ring 7 comprises a cylindrical bore 17 provided with raceways that have, in axial section, a concave internal profile suitable for the rolling elements 9, 10, an outer cylindrical surface 18 on which the pulley 2 is mounted, and two front surfaces 19, 20.

Alternatively, the bearing may comprise a different number of rows of rolling elements arranged between the outer and inner rings, for example a single row of rolling elements.

Alternatively, the bearing may comprise other types of rolling elements, for example tapered rollers or needles. Alternatively, the bearing may be a plain bearing.

The bearing 3 advantageously comprises, on each axial side of the radial space 8, an annular seal 21, 22 for closing the radial space between the rings 6, 7 and inside which the rolling elements 9, 10 are housed.

The seals 21, 22 advantageously each comprise a first end fixed in a circumferential groove provided in the bore 17 of the outer ring 7, and a second end formed by a lip in sliding contact with the outer cylindrical surface 14 of the inner ring 6. The radial space 8 is thus closed in a sealed manner axially between the two seals 21, 22.

In the embodiment illustrated in FIG. 1, the bearing 3 also comprises a spacer 23. The spacer 23 is annular and is provided with an outer surface 24 fitted in the bore 13 of the inner ring 6, with a bore 25 forming the mounting bore of the bearing 3, and with two front surfaces 26, 27.

In this embodiment, the bore 25 of the spacer is coaxial with the bore 13 of the inner ring 6. Alternatively, the axis of the bore 25 may be offset with respect to the axis of the bore 13, the spacer 23 then forming an eccentric.

The spacer 23 extends axially out of the bearing 3 in the axial direction towards a support on which the pulley device 1 is intended to be mounted. The spacer 23 advantageously comprises a radial rim 28 against which the front face 15 of the inner ring 6 of the bearing 3 comes to bear. On the axially opposite side from this bearing engagement with the inner ring 6, the radial rim 28 comprises a surface for bearing against the support of the device 1. Such a spacer 23 makes it possible to alter the spacing between the pulley device 1 and the support thereof depending on the application.

Alternatively, the bearing 3 does not comprise a spacer, the bore 13 of the inner ring 6 forming the mounting bore of the bearing 3.

The pulley 2 comprises an outer cylindrical surface 29 intended to cooperate with a transmission element such as a belt or a chain, and an inner surface 30 secured to the outer ring 7. The pulley has a substantially tubular shape and is centered on the central axis X1.

The pulley 2 may advantageously be made of plastics material, and preferably of polyamide, for example of PA6 or PA66. The pulley 2 may advantageously be formed by overmoulding plastics material on the outer ring 7 of the bearing 3. This results in excellent cohesion between these parts. Alternatively, the pulley 2 may be made of metal material, for example of steel, and be mounted tightly on the outer cylindrical surface 18 of the outer ring 7. The pulley 2 may also have other shapes that are optimized depending on the needs of the application.

In another alternative, the outer surface 18 of the outer ring 7 can cooperate directly with a transmission element, and thus forms the pulley for the pulley device 1.

The screw 5 comprises a body 31 and a head 32 at one end of the body 31. The body 31 is housed in the mounting bore of the bearing 3, in this case the bore 25 of the spacer 23.

The protective flange 4 comprises a first radial portion 33 of small diameter provided with an inner edge forming the bore of the flange 4 and an outer edge, a second radial portion 34 of large diameter provided with an inner edge and an outer edge, and an intermediate portion 35 extending substantially axially and connecting the outer edge of the first radial portion 33 and the inner edge of the second radial portion 34.

The first radial portion 33 comes to bear against the front surface 16 of the inner ring 6 and against the front surface 27 of the spacer 23 situated opposite the rim 28, and thus of the support on which the device 1 is intended to be mounted.

The head 32 of the screw 5 has a relatively flat surface that comes to bear against the first radial portion 33 of the flange 4, the first radial portion 33 being axially jammed between the head 32 of the screw 5 and the inner ring 6 of the bearing 3. According to a variant that is not illustrated, a washer may be interposed between the screw head and the substantially radial portion of the flange.

Advantageously, the flange 4 also comprises an axial portion 36 extending axially from the inner edge of the first radial portion 33. The axial portion 36 is housed and secured in the mounting bore 25 of the bearing 3. The axial portion 36 makes it possible to center the flange 4 with respect to the bearing 3, for the one part, and the pulley 2, for the other.

In the embodiment illustrated in FIG. 1, the bore 25 of the spacer 23 is provided with a circumferential groove 37, the axial portion 36 being radially deformed so as to be partially housed in the circumferential groove 37. The flange 4 is kept axially and radially together with the bearing 3 via its axial portion 36 that cooperates with the walls of the circumferential groove 37 provided in the spacer 23. Alternatively, the circumferential groove may be provided in the bore of the inner ring of the bearing if the latter does not have a spacer.

In an alternative that is not shown, the axial portion of the flange may be mounted tightly in the bore of the bearing. In other variants, the axial portion is mounted securely in the mounting bore of the bearing by any other suitable means, for example by adhesive bonding.

The outer edge of the second radial portion 34 of large diameter extends in the immediate vicinity of the pulley 2 so as to form a narrow passage that reduces the risk of outside contaminants getting into the vicinity of the bearing 3.

A circumferential trough 38 is defined by a bottom formed by the cylindrical intermediate portion 35, an inner lateral edge formed by the front surface 16 of the inner ring 6 of the bearing 3, against which the first radial portion 33 of the flange 4 comes to bear, and an outer lateral edge formed by the second radial portion 34 of the flange 4.

In the first embodiment of the invention that is illustrated in FIG. 1, the intermediate portion 35 is cylindrical.

According to the invention, the bottom 35 of the circumferential trough 38 is offset radially towards the inside of the pulley device 1, that is to say in the direction of the axis X1, compared with the outer edge of the front surface 16 of the fixed inner ring 6.

By virtue of the invention, the contaminants that get through the narrow passage defined between the flange 4 and the pulley 2 are collected in the trough 38 at a certain distance from the edge of the inner ring 6 of the bearing, and more particularly at a certain distance from the seal 22.

The flange is formed by cutting out and then stamping a strip of metal, for example steel. Alternatively, the flange can be made of plastics material, for example of polyamide.

Figure 2:
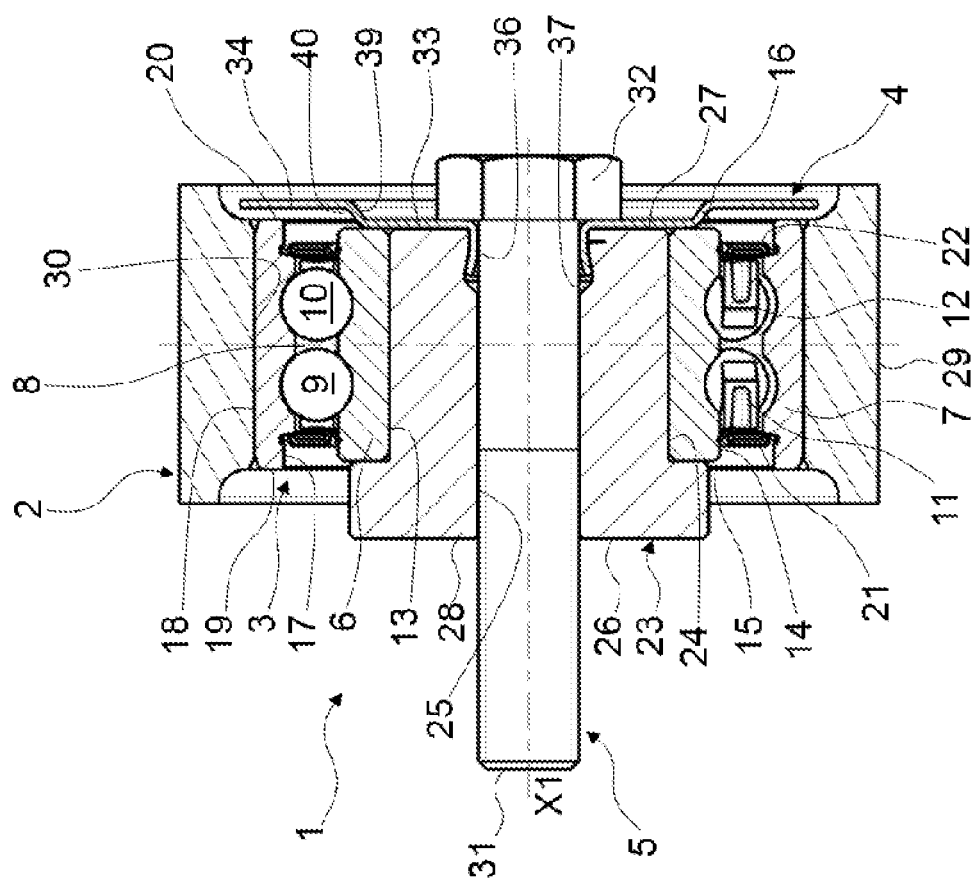
FIG. 2 is a view in axial section of a pulley device according to a second embodiment.

A second embodiment of the invention is illustrated in FIG. 2, in which the same elements have the same reference numerals and differs from the previous embodiment in that the flange 4 is provided with an intermediate portion 39 with a frustoconical shape.

The intermediate portion 39 connects the outer edge of the first radial portion 33 and the inner edge of the second radial portion 34 of the flange 4.

The intermediate portion 39 is frustoconical and directed towards the inside of the pulley device 1 in this second embodiment of the invention.

A circumferential trough 40 is defined by a bottom formed by the frustoconical intermediate portion 39, an inner lateral edge formed by the front surface 16 of the inner ring 6 of the bearing 3, against which the first radial portion 33 of the flange 4 comes to bear, and an outer lateral edge formed by the second radial portion 34 of the flange 4.

The bottom 39 of the trough 40 is inclined with respect to the axis X1 and has a zone of smaller diameter offset radially towards the inside of the pulley device 1 compared with the outer edge of the front surface 16 of the fixed inner ring 6. The trough 40 is thus able to collect contaminants that have managed to get between the flange 4 and the pulley 2.

A third embodiment of the invention is illustrated in FIG. 3, in which the same elements have the same reference numerals and differs from the previous embodiment in that the flange 4 is provided with an intermediate portion 41 with a frustoconical shape that is directed towards the outside of the device 1.

The intermediate portion 41 connects the outer edge of the first radial portion 33 and the inner edge of the second radial portion 34 of the flange 4.

The intermediate portion 41 is frustoconical and directed towards the outside of the pulley device 1 in this third embodiment of the invention.

A circumferential trough 42 is defined by a bottom formed by the frustoconical intermediate portion 41, an inner lateral edge also formed by the intermediate portion 41 on account of the outward direction of its inclination, and an outer lateral edge formed by the second radial portion 34 of the flange 4.

The bottom 41 of the trough 42 is inclined with respect to the axis X1 and has a zone of smaller diameter offset radially towards the inside of the pulley device 1 compared with the outer edge of the front surface 16 of the fixed inner ring 6. The trough 42 is thus able to collect contaminants that have managed to get between the flange 4 and the pulley 2.

A fourth embodiment of the invention is illustrated in FIG. 4, in which the same elements have the same reference numerals and differs from the first embodiment in that the flange 4 is provided with a trough 44 formed by a fold 45 of the flange 4.

The flange 4 comprises a first radial portion 33 of small diameter provided with an inner edge forming the bore of the flange 4 and an outer edge, a second radial portion 34 of large diameter provided with an inner edge and an outer edge, a fold 45 formed at the outer edge of the first radial portion 33, and an intermediate portion 43 connecting the fold 45 and the inner edge of the second radial portion 34.

The fold 45 has an inner annular part formed by the first radial part 33 of small diameter of the flange 4, a radially extending outer annular part, and an intermediate part connecting the outer edge of the first radial portion 33 and the outer annular part. The inner and outer annular parts axially face one another. The inner and outer annular parts are folded into contact with one another. Alternatively, an annular hollow volume can be formed between the inner and outer annular parts.

The intermediate portion 43 extends from the outer annular part of the fold 45. In the embodiment illustrated in FIG. 4, the intermediate portion 43 is cylindrical. Alternatively, the intermediate portion 43 may be frustoconical and directed towards the inside or towards the outside of the pulley device 1.

The circumferential trough 44 is defined by a bottom formed by the cylindrical intermediate portion 43, an inner lateral edge formed by the radial outer annular part of the fold 45, and an outer lateral edge formed by the second radial portion 34 of the flange 4.

The bottom 43 of the circumferential trough 44 is offset radially towards the inside of the pulley device 1, that is to say in the direction of the axis X1, compared with the outer edge of the front surface 16 of the fixed inner ring 6.

The intermediate portion forming the bottom of the circumferential trough has been presented with a shape that is straight, cylindrical or frustoconical and directed towards the outside or the inside of the pulley device 1, in the embodiments described. Alternatively, the intermediate portion may have any other shape suitable for ensuring the collection of contaminants, for example a rounded shape, without departing from the scope of the present invention.

Moreover, all or only some of the technical features of the various embodiments can be combined with one another. Thus, the pulley device can be adapted in terms of cost, performance and ease of use.

What is claimed is:

1. A pulley device for a tensioner roller or winding roller of a transmission element, comprising:
a pulley,
a bearing having a rotating outer ring surmounted by the pulley, a fixed inner ring, the rings being coaxial and forming a radial space between one another, seals closing the radial space on each axial side, and at least one row of rolling elements, arranged in the radial space, and having a mounting bore configured to receive a screw, and
an annular protective flange having a first radial portion of small diameter provided with an inner edge forming a bore of the flange and an outer edge, the first radial portion bearing against a front surface of the fixed inner ring, a second radial portion of large diameter provided with an inner edge and an outer edge, and a substantially axial intermediate portion connecting the outer edge of the first radial portion and the inner edge of the second radial portion, when viewed in cross-section an end of the annular protective flange closest to the inner edge extends radially outwardly away from the screw such that the end of the annular protective flange is located between a circumferential groove in the mounting bore and the screw,
the intermediate portion forms a circumferential trough, the bottom of which is off set radially towards the inside of the pulley device compared with the outer edge of the front surface of the fixed inner ring.

2. The pulley device according to claim 1, wherein the intermediate portion of the flange is cylindrical.

3. The pulley device according to claim 1, wherein the intermediate portion of the flange is frustoconical.

4. The pulley device according to claim 3, wherein the frustoconical intermediate portion is directed towards the inside of the pulley device.

5. The pulley device according to claim 3, wherein the frustoconical intermediate portion is directed towards the outside of the pulley device.

6. The pulley device according to claim 1, wherein the circumferential trough has the second radial portion of large diameter of the flange as its outer lateral edge.

7. A pulley device for a tensioner roller or winding roller of a transmission element, comprising:
a pulley,
a bearing having a rotating outer ring surmounted by the pulley, a fixed inner ring, the rings being coaxial and forming a radial space between one another, seals closing the radial space on each axial side, and at least one row of rolling elements, arranged in the radial space, and having a mounting bore configured to receive a screw, and
an annular protective flange having a first radial portion of small diameter provided with an inner edge forming a bore of the flange and an outer edge, the first radial portion bearing against a front surface of the fixed inner ring, a second radial portion of large diameter provided with an inner edge and an outer edge, and a substantially axial intermediate portion connecting the outer edge of the first radial portion and the inner edge of the second radial portion, wherein
the intermediate portion forms a circumferential trough, the bottom of which is off set radially towards the inside of the pulley device compared with the outer edge of the front surface of the fixed inner ring, wherein the circumferential trough has the front surface of the fixed inner ring as its inner lateral edge.

8. The pulley device according to claim 1, wherein the first radial portion of small diameter has a fold forming the inner lateral edge for the circumferential trough, the intermediate portion extending from the fold.

9. The pulley device according to claim 1, wherein the outer edge of the second radial portion of large diameter extends in the immediate vicinity of the pulley so as to form a narrow passage.

10. The pulley device according to claim 1, wherein the flange comprises an axial portion that extends axially from the bore of the first radial portion and is housed securely in the mounting bore of the bearing.

11. A pulley device for a tensioner roller or winding roller of a transmission element, comprising:
a pulley,
a bearing having an outer ring surmounted by the pulley, an inner ring which is positioned coaxially with the outer ring to form a radial space therebetween, and at least one row of rolling elements positioned in the radial space;
a spacer which defines a mounting bore configured to receive a fastener therein, the inner ring being located on the spacer, the spacer defining a circumferential groove in an axially extending radial surface which is configured to face the fastener; and
an annular protective flange having a first radial portion of small diameter provided with an inner edge forming a bore of the annular protective flange and an outer edge, the first radial portion bearing against a front surface of the inner ring and against a front surface of the spacer, a second radial portion of large diameter provided with a second inner edge and a second outer edge, and a substantially axial intermediate portion connecting the outer edge of the first radial portion and the inner edge of the second radial portion, when viewed in cross-section an end of the annular protective flange is located in the circumferential groove.

12. The pulley device according to claim 11, wherein the intermediate portion of the flange is cylindrical.

13. The pulley device according to claim 11, wherein the outer edge of the second radial portion of large diameter extends in the immediate vicinity of the pulley so as to form a narrow passage.

14. A pulley device for a tensioner roller or winding roller of a transmission element, comprising:
a pulley,
a bearing having an outer ring surmounted by the pulley, an inner ring which is located coaxially with the outer ring to form a radial space therebetween, and at least one row of rolling elements located in the radial space, the inner ring having an innermost axially extending radial surface which defines a mounting bore,
a fastener positioned in the mounting bore of the inner ring,
an annular protective flange having a first radial portion of small diameter provided with an inner edge forming a bore of the flange and an outer edge, the first radial portion bearing against a front surface of the fixed inner ring, a second radial portion of large diameter provided with an inner edge and an outer edge, and a substantially axial intermediate portion connecting the outer edge of the first radial portion and the inner edge of the second radial portion, when viewed in cross-section an outermost radial portion of the annular protective flange is formed by the second radial portion which forms a radially extending axial surface;

the intermediate portion forms a circumferential trough, and wherein, when the pulley device is viewed in cross-section a portion of the annular flange is located between the innermost axially extending radial surface of the inner ring and an outer surface of the fastener such that the portion is located radially therebetween.

15. The pulley device according to claim 14, wherein the intermediate portion of the flange is cylindrical.

16. The pulley device according to claim 14, wherein the outer edge of the second radial portion of large diameter extends in the immediate vicinity of the pulley so as to form a narrow passage.

17. The pulley device according to claim 7, wherein the intermediate portion of the flange is cylindrical.

18. The pulley device according to claim 7, wherein the outer edge of the second radial portion of large diameter extends in the immediate vicinity of the pulley so as to form a narrow passage.

* * * * *